| United States Patent [19] | [11] Patent Number: 4,650,720 |
|---|---|
| Yamaguchi et al. | [45] Date of Patent: Mar. 17, 1987 |

[54] MAGNETIC RECORDING MEDIUM

[75] Inventors: Nobutaka Yamaguchi; Takahito Miyoshi; Toshimitu Okutu; Noburo Hibino; Eiichi Tadokoro; Masaaki Fujiyama, all of Kanagawa, Japan

[73] Assignee: Fuji Photo Film Co., Ltd., Kanagawa, Japan

[21] Appl. No.: 599,116

[22] Filed: Apr. 11, 1984

[30] Foreign Application Priority Data

Apr. 11, 1983 [JP] Japan ................................ 58-63412

[51] Int. Cl.[4] ............................. G11B 5/71; G11B 5/62
[52] U.S. Cl. .................................... 428/480; 427/131; 428/694; 428/695; 428/900
[58] Field of Search ............... 428/694, 695, 900, 480; 427/131; 360/134

[56] References Cited

U.S. PATENT DOCUMENTS

| 4,135,016 | 1/1979 | Ogawa et al. | 428/900 |
|---|---|---|---|
| 4,316,927 | 2/1982 | Kimura et al. | 428/900 |
| 4,395,466 | 7/1983 | Ogawa et al. | 428/695 |
| 4,439,486 | 3/1984 | Yamada et al. | 428/900 |
| 4,474,843 | 10/1984 | Miyoshi et al. | 427/131 |
| 4,561,034 | 12/1985 | Akahane et al. | 428/900 |

*Primary Examiner*—Paul J. Thibodeau
*Attorney, Agent, or Firm*—Sughrue, Mion, Zinn, Macpeak, and Seas

[57] ABSTRACT

A magnetic recording medium is disclosed which comprises a non-magnetic support having provided thereon a magnetic recording layer and a backing layer on the opposite surface thereof, wherein said magnetic recording layer contains a fatty acid, said backing layer contains a cellulose resin, and said non-magnetic support has a Young's modulus of $7 \times 10^{10}$ to $1 \times 10^{13}$ dyn/cm$^2$.

14 Claims, No Drawings

MAGNETIC RECORDING MEDIUM

FIELD OF THE INVENTION

The present invention relates to a magnetic recording medium provided with a backing layer which the improves jitter characteristics of the magnetic recording medium.

BACKGROUND OF THE INVENTION

With the increased usage of compact video tape recorders (hereinafter "VTR"), it has been required that various characteristics of video tapes be improved. One of these characteristics is jitter. Jitter occurs as a result of the fluctuation of the time axis when a magnetic head mechanically scans a magnetic recording tape. Jitter deteriorates image quality on a TV monitor and color blur or unevenness occurs. The jitter results from uneven rotation of the video head, elongation or shrinkage of vide tapes, change of tape running speed, etc., where a VTR having a rotation type head is used. Prevention of jitter has been sought by improving the mechanics of the VTR, but such has not been sufficient.

Extensive researches on materials to be used for magnetic recording layers, supports and backing layers have been made in order to improve the jitter characteristics of a magnetic recording tape, and as the result, it has been found in the present invention that a particular combination of (1) lubricants in a magnetic recording layer, (2) binders in a backing layer, and (3) a Young's modulus of a non-magnetic support, remarkably improve the jitter characteristic.

SUMMARY OF THE INVENTION

An object of the present invention is to provide a magnetic recording medium having improved jitter characteristics.

The object of the present invention has been met by providing a magnetic recording medium comprising: a non-magnetic support having provided thereon a magnetic recording layer and a backing layer on the opposite surface thereof, wherein said magnetic recording layer contains a fatty acid, said backing layer containing a cellulose resin and said support has a Young's modulus of $7 \times 10^{10}$ to $1 \times 10^{13}$ dyn/cm$^2$.

DETAILED DESCRIPTION OF THE INVENTION

The cellulose resins used in this invention can include a cellulose derivative such as cellulose acetate butyrate, cellulose diacetate, cellulose triacetate, cellulose propionate, cellulose acetate propionate or nitrocellulose and the mixtures thereof as described in, for example, U.S. Pat. No. 4,135,016. The cellulose resins can be used in an amount of 1 to 100 parts by weight, preferably 3 to 50 parts by weight and more preferably 5 to 25 parts by weight per 100 parts by weight of the magnetic substance.

The fatty acid used in this invention can include caprylic acid, capric acid, lauric acid, myristic acid, palmitic acid, stearic acid, behenic acid, oleic acid, elaidic acid, linolic acid, linolenic acid, stearolic acid and the like as described in, for example, U.S. Pat. Nos. 4,135,016, 4,411,960 and 4,171,406. Of these, lauric acid, palmitic acid, stearic acid, myristic acid and oleic acid are preferred. However, fatty acids should not be limited thereto and isomerized fatty acids and the mixture thereof can also be used. Fatty acids having 10 to 22 carbon atoms are easily available and have preferred characteristics. The amount of a fatty acid is preferably 0.01 to 10 and is more preferably 0.1 to 5 parts by weight per 100 parts by weight of ferromagnetic particles.

Any conventional plastic supports such as polyethylene terephthalate, polyethylene naphthalate, polyamide, polyimide, triacetyl cellulose and other supports as described in, for example, U.S. Pat. No. 4,135,016 can be used in the present invention. Preferred plastic support includes polyethylene terephthalate. A metal thin film can be used, if desired. The above-mentioned plastic supports can be provided on their furface with a layer of aluminum, copper, nickel or zinc which is deposited by vacuum evaporation.

It is necessary that the support has a Young's modulus of $7 \times 10^{10}$ to $1 \times 10^{-}$dyn/cm$^2$, preferably $8 \times 10^{10}$ to $8 \times 10^{11}$ dyn/cm$^2$, in the main direction. The term "main direction" referred to herein indicates the direction in which recording is carried out by the magnetic recording system. For example, it is necessary for various tapes for audio recording (3.8 mm width Phillips type compact cassette, ¼ inch open reel, ¼ inch endless cartridge) to have a Young's modulus of $7 \times 10^{10}$ to $1 \times 10^{13}$ dyn/cm$^2$, preferably $8 \times 10^{10}$ to $8 \times 10^{11}$ dyn/cm$^2$ in the machine (longitudinal) direction. It is necessary for video tapes of 2 inches width for broadcasting to have a Young's modulus of $7 \times 10^{10}$ to $1 \times 10^{13}$ dyn/cm$^2$, preferably $8 \times 10^{10}$ to $8 \times 10^{11}$ dyn/cm$^2$ in the transverse direction because video signals are recorded in the tape width direction (transversal direction) by a four head system. Yet it is more preferably for those tapes to have a Young's modulus of $7 \times 10^{10}$ to $1 \times 10^{13}$ dyn/cm$^2$, preferably $8 \times 10^{10}$ to $8 \times 10^{11}$ dyn/cm$^2$ in the machine direction because audio signals are recorded in the machine direction.

It is necessary for video tapes of 1 inch for broadcasting, compact video tapes of ½ inch (VHS system, Beta format system, and the like), and Umafic video tape of ¾ inch to have a Young's modulus of $7 \times 10^{10}$ to $1 \times 10^{13}$ dyn/cm$^2$, preferably $8 \times 10^{10}$ to $8 \times 10^{11}$ in the machine direction because both of video signals and audio signals are actually recorded in the machine direction.

A method for preparing a magnetic coating composition used in this invention is disclosed in detail in Japanese Patent Publication No. 26890/81.

Ferromagnetic fine particles used in this invention include $\gamma$-Fe$_2$O$_3$, Co-containing $\gamma$-Fe$_2$O$_3$, Fe$_3$O$_4$, Co-containing Fe$_3$O$_4$, Bertholide compound of $\gamma$-Fe$_2$O$_3$ and Fe$_3$O$_4$ (FeOx, $1,33 < x < 1.50$), Bertholide compound of Co-containing $\gamma$-Fe$_2$O$_3$ and Fe$_3$O$_4$ (FeOx, $1.33 < x < 1.50$), CrO$_2$, Co-Ni-P alloy, Co-Ni-Fe alloy, Co-Ni-Fe-B alloy, Fe-Ni-Zn alloy, Fe-Mn-Zn alloy, Fe-Co-Ni-P alloy, Ni-Co alloy, plate-shape barium ferrite and those conventionally used ferromagnetic particles. Specific examples are disclosed in Japanese Patent Publication No. 26890/81.

Thermoplastic resins which can be used in the magnetic recording layer include those having a softening point of not higher than 150° C., a number average molecular weight of 10,000 to 200,000, and a polymerization degree of about 200 to 2,000, e.g., a copolymer of vinyl chloride and vinyl acetate, a copolymer of vinyl chloride and vinylidene chloride, a copolymer of vinyl chloride and acrylonitrile, a copolymer of acrylte and acrylonitrile, a copolymer of acrylate and vinylidene chloride, a copolymer of acrylate and styrene, a copolymer of methacrylate and acrylonitrile, a copolymer of methacrylate and vinylidene chloride, a copolymer of methacrylate and styrene, urethane elastomer, polyvinyl fluoride, a copolyer of vinylidene chloride and acrylonitrile, a copolymer of butadiene and acrylonitrile, a polyamide resin, polyvinyl butyral, a cellulose derivative (cellulose acetate butyrate, cellulose diacetate, cellulose triacetate, cellulose propionate, nitrocellulose and the like), a copolymer of chlorovinyl ether and acrylate, an amino resin, various synthetic rubber type thermoplastic resin and the mixture thereof as described in U.S. Pat. No. 4,135,016. Of these, a copolymer of vinyl chloride and vinyl acetate, a copolymer of vinyl chloride and vinylidene chloride, a urethane elastomer and a cellulose derivative are preferred. Specific examples of those resins are disclosed in Japanese Patent Publication No. 26890/81. The amount of the thermoplastic resins which can be used is 1 to 100 parts by weight, preferbly 3 to 60 parts by weight and more preferably 5 to 30 parts by weight per 100 parts by weight of the magnetic substance.

The molecular weight of curing agents used for a magnetic recording layer is not higher than 200,000, preferably 50 to 10,000, in the state of the coating composition, and becomes infinite by the reaction, such as a condensation reaction or addition reaction, after coating and drying the coating layer. Of resins useful for the curing agents, those that do not soften nor melt until the resins are heat-decomposed are preferred. Specifically, those resins include a phenol resin, an epoxy resin, a curable polyurethane resin, a urea resin, a melamine resin, an alkyd resin, a silicone resin, an acryl type reactive resin, a mixture of a high molecular polyester resin and an isocyanate prepolymer, a mixture of a copolymer of methacrylate and a diisocyanate prepolymer, a mixture of polyester polyol and polyisocyanate, a urea formaldehyde resin, a mixture of a low molecular glycol/high molecular diol/triphenyl methane triisocyante, a polyamine resin and a mixture thereof. Of these, polyisocyanate based resins are preferred. Preferably, the curing agent is used in an amount of 1 to 50 parts by weight per 100 parts by weight of the magnetic substance.

The typical examples of resins for the curing agents are disclosed in Japanese Patent Publication No. 26890/81.

Lubricants which can be used in this invention include silicone oil, carbon black graft polymer, molybdenum disulfide, tungsten disulfide, fatty acid esters composed of a monobasic fatty acid having 12 to 16 carbon atoms and monohydric alcohol having 3 to 12 carbon atoms and a fatty acid esters consisting of a monobasic fatty acid having not less than 17 carbon atoms and a monohydric alcohol having 21 to 23 carbon atoms inclusive of the number of carbon atoms of the fatty acid. These lubricants can be added in an amount of 0.2 to 20, preferably 0.5 to 10, parts by weight per 100 parts by weight of the binder. Details thereof are disclosed in Japanese Patent Publication No. 26890/81.

Abrasive which can be used in this invention include those commonly used such as fused alumina, silicone carbide, chrome oxide, corundum, artificial corundum, diamond, artificial diamond, garnet, and emery (main component, corundum and magnetite). The average particle diameter is 0.05 to $5\mu$ and is preferably 0.1 to $2\mu$. These abrasives can be added in an amount of 7 to 20, preferably 10 to 15, parts by weight per 100 parts by weight of the binder. Details thereof are disclosed in Japanese Patent Publication No. 26890/81.

Nonionic surfactants such as alkylene oxides, glycerols and glycidols; cationic surfactants such as higher alkyl amines, quaternary ammonium salts, heterocyclic compounds (e.g., pyridine), phosphoniums or sulfoniums; anionic surfactants having an acid group such as carboxylic acid, sulfonic acid, phosphoric acid, sulfate or phosphate; and amphotric surfactants such as amino acids, amino sulfonic acids, sulfates or phosphates of aminoalcohols can be used in this invention.

These surfactants can be used alone or in combination. The amount of the surfactants is 0.1 to 5 parts by weight per 100 parts by weight of the magnetic substance. These surfactants can be used as an antistatic agent. However, they can also be used for other purposes, e.g., for improving the dispersing property, the magnetic characteristics and the lubricity and as a coating aid.

The magnetic recording layer can be prepared by dissolving a coating composition in an organic solvent and coating it on a non-magnetic support at a dry thickness of 0.1 to $20\mu$, preferably 1 to $15\mu$ and more preferably 2 to $10\mu$.

Magnetic particles, the above-mentioned binders, dispersing agents, lubricants, abrasives, antistatic agents and solvents are mixed and kneaded to prepare a magetic coating composition.

The magnetic particles and other components can be put into a mixing and kneading device at the same time or in sequence. For example, there is a method in which magnetic particles are first added into a solvent containing a dispersing agent and mixed and kneaded for a predetermined period of time, and then the rest of the components are added and mixed and kneaded to prepare a magnetic coating composition.

Various mixing-kneading devices are used to mix, knead and disperse. For example, a two-roll mill, a three-roll mill, a ball mill, a pebble mill, trommel, a sand grinder, Szegvari attritor, a high speed impeller dispersing device, a high speed stone mill, a high speed impact mill, a disper, a kneader, a high speed mixer, a homogenizer and an ultrasonic dispersing device.

The art of mixing, kneading and dispersing is disclosed in T. C. Patton: *Paint Flow and Pigment Disperion* (1964, John Wiley & Sons Co., Ltd.). It is also described in U.S. Pat. Nos. 2,581,414 and 2,855,156.

The method for providing a magnetic recording layer on a support includes air doctor coating, blade coating, air knife coating, squeeze coating, impregnating coating, reverse roll coating, transfer roll coating, gravure coating, kiss coating, cast coating and spray coating and other coating methods. Those methods are described in detail in *Coating Engineering* on pages 253 to 277 by Asakura Shoten (Mar. 20, 1971).

Organic solvents which can be used for coating include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or monoethyl ether of glycol acetate; glycol ethers such as ether, glycol dimethyl ether, glycol monoethyl ether or dioxane; tars (aromatoc hydrocarbon) such as benzene, toluene or xylene; chlorinated hydrocarbons such as methylene chloride, ethylene chloride, carbon tetrachloride, chloroform, ethylene chlorohydrin or dichlorobenzene as described in, for example, U.S. Pat. No. 4,135,016. Of these, methyl ethyl ketone, methyl isobutyl ketone, cyclohexanone, butanol, butyl acetate, toluene and xylene are preferred. The solvents can be used in an amount of 100 to 1,000 parts by weight, preferably 150 to 750 parts by weight and more preferably 200 to 500 parts by weight per 100 parts by weight of the magnetic substance.

The magnetic recording layer coated on a support by the above mentioned manner is, if desired, subjected to magnetic orientation to orientate the magnetic particles therein and is dried. If desired, the magnetic recording layer is subjected to a surface smoothing treatment and slit to a predetermined shape to prepare the magnetic recording medium of this invention.

A magnetic orientation field can be applied with either an alternate or direct current of about 500 to 2,000 gauss. The drying temperature is about 50° to 100° C. and the period for drying is about 3 to 10 minutes.

Carbon black and graphite can be mixed into the backing layer to provide antistatic properties. The amount of carbon black and/or graphite is 0.1 to 10 parts by weight, preferably 0.5 to 5 parts by weight and more preferably 1 to 3 parts by weight per 100 parts by weight of the binder.

Inorganic pigments such as magnesium silicate, calcium carbonate, aluminum silicate, barium sulfate or clay and organic particles such as benzoguanamine or polyethylene terephthalate can be added into the backing layer to adjust surface roughness of the coated layer to improve running properties and durability. The inorganic pigment and/or organic particles can be added in an amount of 10 to 300 parts by weight, preferably 15 to 200 parts by weight and more preferably 50 to 150 parts by weight per 100 parts by weight of the binder.

The above-mentioned surfactants, abrasives and lubricants used for the magnetic recording layer can be used for the backing layer.

Binders except cellulose resins and organic solvents can be used for the magnetic recording layer can be used for the backing layer in an amount of 0.1 to 10 parts by weight, preferably 0.5 to 5 parts by weight and more preferably 1 to 3 parts by weight per 100 parts of the binder.

The techniques of preparing a coating composition for a magnetic recording layer and of coating the composition can also be used for preparing a coating composition for the backing layer and for coating the composition. This invention will be further explained in more detail by the following Examples. In those Examples, all parts are by weight.

EXAMPLE 1

Composition for the Magnetic Recording Layer

Co-added $\gamma$-$Fe_2O_3$ (Particle size 0.35$\mu$, acicular ratio 1:8, Coercive force 650 Oe): 300 parts
Fatty acid (Oleic acid): 6 parts
Copolymer of vinyl chloride and vinyl acetate (vinyl chloride:vinyl acetate=87:13, polymerization degree 420): 30 parts
Polyester polyurethane (synthesized from butylene adipate and 4,4'-diphenyl methane diisocyanate, styrene equivalent molecular weight about 130,000): 30 parts
$Cr_2O_3$: 12 parts
Butyl acetate: 600 parts The above composition was dispersed in a ball mill for 48 hours. To the dispersion, 40 parts of "Desmodule L-75" (solid content: 30 parts, 75 wt% ethyl acetate solution of an adduct of 1 mole of trimethylol propane and 3 moles of toluylene diisocyanate) were added and dispersed for 30 min. Then, the dispersion was filtrated by a filter having an average pore size of 1$\mu$ to prepare a magnetic coating composition.

A coating composition for the backing layer having the following composition was coated on a polyethylene terephthalate film (Young's modulus of $8 \times 10^{10}$ dyn/cm$^2$ in the machine direction) having a thickness of 14$\mu$. Then the above magnetic coating composition was coated thereon by a doctor coating method. The magnetic layer was subjected to magnetic orientation in the machine direction and to a calendering treatment. Then, it was slit to a width of ½ inch to prepare a video tape for VHS (Sample No. 1).

Composition of the Backing Layer

Cellulose resin (nitrocellulose, H.½): 400 parts
Desmodule L-75: 133 parts
Carbon black (furnace black, particle size 60 m$\mu$): 300 parts
Methyl ethyl ketone: 2000 parts
Methyl isobutyl ketone: 2000 parts The above composition without the curing agent for the backing layer was dispersed in a ball mill for 90 hours. To the dispersion, the curing agent was added, and after adjusting the viscosity of the mixture, it was filtrated by a filter having a pore size of 5$\mu$ and coated.

The thickness of the magnetic recording layer was 5$\mu$ and that of the backing layer was 1.5$\mu$.

COMPARATIVE EXAMPLE 1

The same procedrue as in Example 1 was repeated except that the following coating composition was used to prepare Sample Nos. 2 to 5.

Sample No. 2 was prepared without a fatty acid in the magnetic recording layer.

Sample No. 3 was prepared using liquid paraffin instead of a fatty acid.

Sample No. 4 was prepared without a cellulose resin in the backing layer, using additionally "Desmodule L-75" in the same amount as the cellulose resin.

Sample No. 5 was prepared using a copolymer of vinyl chloride and vinyl acetate used for the magnetic recording layer in Example 1 instead of a cellulose resin.

COMPARATIVE EXAMPLE 2

The same procedure as in Example 1 was repeated except that a polyethylene terephthalate support having a Young's modulus of $5 \times 10^{10}$ dyn/cm$^2$ was used to prepare Sample No. 6.

EXAMPLE 2

The same procedrue as in Example 1 was repeated except that a polyethylene terephthalate support having a Young's modulus of $7 \times 10^{10}$ dyn/cm$^2$ was used to prepare Sample No. 7.

EXAMPLE 3

The same procedure as in Example 1 was repeated except that a polyethylene terephthalate support (Young's modulus of $5 \times 10^{10}$ dyn/cm$^2$) which was vapor deposited with aluminum to have a Young's modulus of $10 \times 10^{10}$ dyn/cm$^2$ in the machine direction was used to prepare Sample No. 8.

EXAMPLE 4

Sample Nos. 9 and 10 were prepared in the same manner as in Example 1 except that the type of a fatty acid (oleic acid) in the mangetic recording layer and the type of a cellulose resin (nitrocellulose, H.½) in the backing layer were changed.

| Sample No. | Fatty Acid | Cellulose Resin |
| --- | --- | --- |
| No. 9 | Stearic acid | Acetyl butyl cellulose |
| No.10 | Lauric acid | Acetyl propyl cellulose |

Video tapes of Samples Nos. 1 to 10 were mounted on a video cassette for VHS and the results of the evaluation of jitter are shown in the Table.

It is clear from the Table that jitter can be improved in this invention where the following three conditions simultaneously are met, that is, (1) a fatty acid is included in the magnetic recording layer, (2) a cellulose resin is included in the backing layer and (3) the Young's modulus of the support is $7 \times 10^{10}$ dyn/cm$^2$.

Regarding Sample No. 4, the coating composition for the backing layer was filtrated with difficulty and the final tape could not be prepared.

TABLE 1

|  | Sample No. | Fatty Acid in Magnetic Recording Layer | Cellulose Resin in Backing Layer | Young's Modumuls of support: dyn/cm$^2$ (Machine Direction) | Jitter Characteristics |
| --- | --- | --- | --- | --- | --- |
| Example 1 | 1 | Oleic Acid | Nitrocellulose | $8 \times 10^{10}$ | O |
| Comparative Example 1 | 2 | None | " | " | XX |
| Comparative Example 1 | 3 | None (liquid Paraffin) | " | " | X |
| Comparative Example 1 | 4 | Oleic Acid | None | " | Sample could not be prepared |
| Comparative Example 1 | 5 | " | None (Copolymer of Vinyl Chloride - Vinyl Acetate) | " | X |
| Comparative Example 2 | 6 | " | Nitrocellulose | $5 \times 10^{10}$ | X |
| Example 2 | 7 | " | " | $7 \times 10^{10}$ | O |
| Example 3 | 8 | " | " | $10 \times 10^{10}$ | O |
| Example 4 | 9 | Stearic Acid | Acetyl Butyl Cellulose | $8 \times 10^{10}$ | ⊙ |
| Example 4 | 10 | Lauric Acid | Acetyl Propyl Cellulose | " | O |

The evaluation method was as follows:

A gray scale signal (gradation wave) was recorded on each tape sample which were counted on a VTR of a VHS system and the jitter amount (μsec) was visually observed where the horizontal axis or reproduced images on a monitor television were enlarged 10 times. The jitter characteristics are shown by the following marks.

⊙ : less than 0.1 μsec.
O: not less than 0.1 μsec to less than 0.2 μsec
X: not less than 0.2μ to less than 0.3 μsec
XX: not less than 0.3 μsec While the invention has been described in detail and with reference to specific embodiment thereof, it will be apparent to one skilled in the art that various changes and modifications can be made therein without departing from the spirit and scope thereof.

What is claimed is:

1. A magnetic recording medium comprising a non-magnetic support having provided thereon a magnetic recording layer and a backing layer on the opposite surface thereof, wherein said magnetic recording layer contains a fatty acid selected from the group consisting of lauric acid, palmitic acid, stearic acid and oleic acid in an amount of 0.01 to 10 parts by weight per 100 parts by weight of ferromagnetic particles, said backing layer contains a cellulose resin, and said non-magnetic support has a Young's modulus of $8 \times 10^{10}$ to $8 \times 10^{11}$ dyn/cm$^2$ in the direction in which recording is carried out.

2. The magnetic recording medium as claimed in claim 1, wherein said fatty acid is contained in an amount of 0.1 to 5 parts by weight per 100 parts by weight of ferromagnetic particles.

3. The magnetic recording medium as claimed in claim 1, wherein said cellulose resin is a cellulose derivative.

4. The magnetic recording medium as claimed in claim 1, wherein said cellulose derivative is selected from the group consisting of cellulose acetate, butyrate, cellulose diacetate, cellulose triacetate, cellulose propionate, cellulose acetate propionate, nitrocellulose, and mixtures thereof.

5. The magnetic recording medium as claimed in claim 1, wherein said cellulose resin is contained in an amount of 1 to 100 parts by weight per 100 parts by weight of ferromagnetic fine particles in the magnetic recording layer.

6. The magnetic recording medium as claimed in claim 5, wherein said cellulose resin is contained in an amount of 3 to 50 parts by weight per 100 parts by weight of ferromagnetic fine particles in the magnetic recording layer.

7. The magnetic recording medium as claimed in claim 6, wherein said cellulose resin is contained in an amount of 5 to 25 parts by weight per 100 parts by weight of ferromagnetic fine particles in the magnetic recording layer.

8. The magnetic recording medium as claimed in claim 1, wherein said non-magnetic support has a Young's modulus of $8 \times 10^{10}$ to $8 \times 10^{11}$ dyn/cm$^2$ in the machine direction.

9. The magnetic recording medium as claimed in claim 1, wherein said non-magnetic support has a Young's modulus of $8 \times 10^{10}$ to $8 \times 10^{11}$ dyn/cm$^2$ in the transverse direction.

10. The magnetic recording medium as claimed in claim 1, wherein said non-magnetic support is a plastic or a metal thin film.

11. The magnetic recording medium as claimed in claim 10, wherein said non-magnetic support is a plastic.

12. The magnetic recording medium as claimed in claim 11, wherein said plastic is selected from the group consisting of polyethylene terephthalate, polyethylene naphthalate, polyamide, polyimide and triacetyl cellulose.

13. The magnetic recording medium as claimed in claim 12, wherein said plastic is polyethylene terephthalate.

14. The magnetic recording medium as claimed in claim 11, wherein said plastic is provided on the surface thereof a vacuum deposited layer of aluminum, copper, nickel or zinc.

* * * * *